United States Patent Office 3,187,747
Patented June 8, 1965

3,187,747
SURGICAL ABSORBENT PAD HAVING
ION EXCHANGE PROPERTIES
Alfred A. Burgeni, Short Hills, and John C. Simkevich, Monmouth Beach, N.J., assignors, by mesne assignments, to Johnson & Johnson, New Brunswick, N.J., a corporation of New Jersey
No Drawing. Filed Mar. 5, 1962, Ser. No. 177,197
13 Claims. (Cl. 128—156)

This invention relates to absorbent products which are capable of absorbing body fluids and also have the ability to acidify the fluids and adjacent body tissue. While not limited thereto, the invention relates particularly to vaginal tampons and similar articles which absorb and hold menstrual fluid and also, by means of a controlled release of hydrogen ions, acidify the fluid and other vaginal discharge as well as vaginal mucosa which it contacts when positioned intravaginally. There is contemplated, as embodiments of the invention, such articles as vaginal packs, dental cones, absorbent dressings, bandages, and similar products which are adapted to be placed in contact with the body to absorb body fluids. For purposes of presenting the invention, reference will be made to vaginal tampons as an illustrative embodiment.

The vaginal mucosa in the normal, healthy vagina is weakly acidic and has a pH of approximately 4.5. This acid condition provides an effective barrier against the growth in the vagina of those pathogenic microorganisms which are normally associated with trichomoniasis and non-specific vaginal infections because such microorganisms do not proliferate below a pH of about 5. If, however, the pH of the vaginal mucosa becomes more basic, i.e., more than about 5, these microorganisms tend to proliferate. Such a change in the pH of the vaginal mucosa from about 4.5 to one which is more basic may be brought about by various physiological and pathological conditions and may occur at any time during the menstrual cycle. During menstruation, particularly, the vaginal pH becomes more basic due to the presence of menstrual fluid which has a pH of from about 7 to about 7.5. As a result, the protective barrier provided by the normal acidity of the vagina becomes less effective, and conditions more favorable to the growth of the pathogenic microorganisms occur.

During the menstrual period, tampons and similar catamenial devices are customarily used to absorb the menstrual fluid. The tampons, which are positioned within the vagina to absorb the fluid, may be of a variety of shapes and sizes, but generally consist of absorbent fibrous material which is usually compressed somewhat into an oblong cylindrical shape to increase the absorbent capacity of the tampons and to aid in their insertion intravaginally. Such tampons have achieved wide acceptance and it would be eminently desirable, therefore, to provide a tampon which has essentially the characteristics of conventional tampons with respect to absorbing, appearance and the like, and which is also capable of inhibiting the growth of pathogenic microorganisms by establishing and maintaining proper acidic conditions in the vagina.

We have discovered that the foregoing may be obtained by providing a tampon which includes fibrous or filamentary material formed from a man-made or synthetic polymeric component having textile fiber-forming properties and having integrally associated therewith a polymeric component having acidifying properties.

The fibers included in the product of the invention are composite in nature. They comprise multi-component systems of polymers in molecular or micellar association with each other and contain at least one polymeric component capable of forming fibers similar to textile fibers, and at least one other polymeric component which has acidifying properties. In the more specific form of the invention, the polymer having acidifying properties is a cation exchange polymer in hydrogen form. The fiber forming polymeric component is of the type that is capable of forming fibers that may be processed in accordance with conventional textile operations and techniques. Because of the manner in which the two types of polymers are associated with each other in the fiber in molecular or micellar relationship to form, in effect, an "alloy" of such components, the resulting fiber will be a fiber like a textile fiber which can also be processed in the same manner.

The term "molecular or micellar association" signifies that the polymeric components forming the fibers are dispersed in each other in the fibers in form of ultimate structural units or submicroscopic aggregates thereof. Such fibers may be formed from melts of such components or from homogeneous solutions of mutually compatible polymers.

A particular advantage of the product, e.g., a tampon, made in accordance with this invention is its excellent mechanical properties in both dry and wet states. More specifically, an article made from an aggregate of the alloy fibers is strong and coherent, and under conditions of use, has form stability. Accurate controls with regard to quantity and distribution in the fiber of the polymeric component having acidifying properties, and hence in the article formed from the fibers, may be obtained. The fibers are of such nature that they are readily processed in accordance with various textile fiber techniques of the type commonly employed in the manufacture of the tampons and other absorbent products.

Because of the intimate dispersion and mutual attraction of the polymeric components in the fibers, leaching and gelling of the polymer having acidifying properties from the fiber is minimized. Due to its fibrous structure, a tampon made in accordance with the invention is readily penetrated by the vaginal fluids and absorbs and holds the fluid.

The tampons may be made at costs comparable to those of the conventional type and provide a medium which not only effectively absorbs menstrual fluid but also has inherent hygienic properties.

The polymeric component having the desired fiber forming characteristics may be selected from well-known types, such as rayon. The acidifying polymeric component, which may also, but not necessarily, have fiber forming properties, includes a number of materials compatible therewith. When the fiber is incorporated in the tampon, the polymeric component having the acidifying properties acidifies the vaginal fluid as well as the lining of the vagina with which it comes in contact by an ion-exchange reaction by exchanging hydrogen ions for cations in the menstrual fluid, thereby reducing the pH of the fluid.

The fibers may be made in accordance with known techniques as, for example, by spinning filaments from a multi-component system of miscible or intermixed polymers. The fibers may thus be said to consist of an "alloy" of two or more polymeric materials since they are intimately associated with each other in molecular or micellar form. Due to the manner in which the components are alloyed, the resulting fiber has, in addition to the desired ion-exchange properties, adequate tensile strength and other desirable textile processing characteristics.

The tampon may be made to have the general appearance of conventional tampons. Because of its fibrous and substantially non-gelatinous structure, the tampon is highly absorbent, strong and coherent and retains its form when wetted by body fluids. Accurate controls with regard to its acidifying properties may be readily obtained by selectively distributing the polymeric material having the acidifying properties in appropriate amounts in the fiber. This permits uniformity in manufacture and reproducibility of the tampon. The alloy fibers may be uniformly distributed throughout the tampon or may be located selectively therein, as for example, on the outer surface, so that they will be directly contacted by the vaginal mucosa and by menstrual fluid. Because of the excellent textile processing properties of the alloy fibers, essentially all the mechanical steps of textile-fiber processing, such as opening, carding, drafting, and the like, may be followed in preparing articles embodying this invention.

The fibers used in preparing the tampon of the invention may, by way of example, contain regenerated cellulose (e.g., viscose) as the fiber forming polymeric component and carboxymethyl cellulose in hydrogen form as the acidifying component. The amount of the carboxymethyl cellulose and the regenerated cellulose present in the fiber may be varied while still providing a fiber suitable for processing. The preferred ratio, by weight, is about one part carboxymethyl cellulose in the hydrogen form to two parts of regenerated cellulose. Good results have been obtained with alloy fibers containing from about 15% to about 40% of the carboxymethyl cellulose, the remainder being regenerated cellulose.

The carboxymethyl cellulose in the form of its sodium salt may be incorporated into the viscose at any convenient stage of preparation and ripening. In order to produce an intimate mixture of the components prior to spinning to form filaments, the mixture is desirably stirred mechanically or homogenized.

After the sodium carboxymethyl cellulose is mixed with the viscose, the mixture is then extruded through spinnerets into a coagulating and regenerating bath to form filaments and is then further processed by customary purification techniques to desulfurize, scour and bleach the filaments so formed. The sodium carboxymethyl cellulose in the fiber may then be converted to the desired hydrogen form by treating the filaments with an acid; e.g., by passing through an acid bath. The strength of the acid is not critical within a fairly wide range of concentration. However, to obtain effective conversion of the sodium carboxymethyl cellulose into the hydrogen form, it is desirable to maintain the pH of the acid bath below 2.5.

Substantially complete conversion of the sodium carboxymethyl cellulose into its hydrogen form may be accomplished by passing the filaments through a series of acid baths of which at least the last ones are water containing a minimum of cations in order to minimize reconversion of the carboxymethyl cellulose back to the salt form. The converted fibers are then washed free of acid, preferably again in water low in cation concentration. Subsequently, the water content of the fibers is reduced in a hydroextractor or by means of squeeze rolls. The fiber may then be immersed in ethyl or isopropyl alcohol to remove the remaining moisture. Instead of alcohol, other solvents or mixtures thereof may be used providing they are soluble in water and do not swell the fibers appreciably. The object in replacing the remaining moisture in the filaments with alcohol and similar materials is to cause a de-swelling of the filaments to minimize their sticking to each other during drying.

While a fiber comprising an alloy of regenerated cellulose and carboxymethyl cellulose in the hydrogen form is preferred in forming the article of this invention, fibers formed from other components may be used. For example, instead of regenerated cellulose, hydroxyethyl cellulose may be used, e.g., hydroxyethyl cellulose sold under the name of "Ethylose" by the Rayonier Corporation. This product, alloyed with 20% to 40% carboxymethyl cellulose in the hydrogen form, is eminently suitable for making the products of the invention.

Examples of other polymeric components having suitable fiber forming properties are cellulose acetate, polyethylene oxide, and water-insoluble derivatives of polyvinyl alcohol. Other polymeric materials having sufficiently large molecular weights and an appropriate chemical structure to enable them to be formed into textile fibers which are essentially insoluble in water may be used. Examples of polymers having acidifying properties are polyacrylic acid, polymetacrylic acid, the polymerization and copolymerization products of maleic and itaconic acid, alginic acid, and various polyglucosides such as cellulose succinate, cellulose citrate, cellulose maleate and cellulose phthalate.

The preferred polymeric component having fiber forming properties is one which forms an absorbent fiber, such as a rayon fiber, in order that the polymeric component having the acidifying properties may be readily available to exercise its acidity. However, satisfactory results may be obtained by using fiber forming polymeric components which form fibers which are less absorbent, e.g., cellulose acetate, and, if desired, essentially non-absorbent.

In selecting the polymeric component having the desired fiber forming properties to be used with the polymeric component having acidifying properties, consideration should be given to the mutual compatibility of the respective components in the desired fibrous form. The components should be retained in the fiber and should not separate appreciably in use. They desirably should be mutually soluble in the solvent used in their preparation in order to obtain proper blending and fiber formation. They also should be regeneratable together or in close sequence. The components should also be mutually compatible with respect to the processes involved in forming the fiber and should lend themselves to processing thereafter in accordance with conventional textile fiber techniques. The solutions used in forming the fibers and in converting the acidifying polymeric component into its hydrogen form, if such processes are employed, should not appreciably dissolve or modify either component. As a practical matter, some of the sodium carboxymethyl cellulose may not be converted completely into the hydrogen form having the desired cation exchange properties. This is not a serious problem so long as most of it is converted to impart adequate acidifying properties to the fibers and to the products which include such fibers.

A tampon which includes alloy fibers containing regenerated cellulose and carboxymethyl cellulose in the hydrogen form is particularly suitable since regenerated cellulose forms excellent textile fibers and since carboxymethylcellulose in the hydrogen form has good acidifying properties and is also non-toxic and non-irritating. The following is an illustrative example of a method of making such fibers from which articles of this invention may be made. The method follows and incorporates techniques known to those skilled in the art of making rayon fibers.

A viscose solution containing about 80 grams of cellulose as sodium xanthate in 1 kg. of solution is prepared in accordance with conventional procedures. 34 grams of a commercial sodium carboxymethyl cellulose of medium viscosity having a degree of substitution of from about 0.70 to about 0.75 (e.g., sodium carboxymethyl cellulose sold by Hercules Powder Company under the code name CMC–7MT) is then gradually added to the viscose solution and the solution stirred until the sodium carboxymethyl cellulose dissolves. While stirring, a sufficient amount of dilute sodium hydroxide is added to produce a spinning solution containing 5.6% cellulose, 2.4% sodium carboxymethyl cellulose (air dry) and 7% sodium hydroxide. The solution is then passed through a homogenizer, filtered and extruded through spinnerets into a spinning bath to form a tow of filaments having a denier of 1.5. The tow is then desulfurized and washed in the conventional manner. Spinning, coagulating, regenerating and purifying the filaments is done the same way as in the conventional manufacture of rayon.

After washing and hydro-extracting, the tow is passed through aqueous baths containing 2% sulfuric acid and is then washed with a series of washes to remove the acid. Deionized water is used in the last sulfuric acid bath as well as in all washes. The tow is again hydro-extracted and passed through an isopropanol bath to replace the water remaining in the fiber with isopropanol. The tow is then centrifuged and dried. It may then be cut to the desired length and compressed to an oblong cylindrical shape to form a tampon, or blended with other fibers prior to so forming.

The initial pH of the fiber, prepared as above and determined by titrating with N/10 sodium hydroxide in biological saline solution (0.85% NaCl), is about 2.9. The conditioned fibers will have a neutralizing capacity of about 5.5 ml./g. at pH 4.5 and of about 8.0 ml./g. at pH 8.

The procedure described above may be varied with regard to the concentration of the spinning solution, the spinning bath, and the after treatments. The ratio of the sodium salt of the carboxymethyl cellulose to the cellulose in the spinning solution may also be raised or lowered within fairly wide limits. For example, filaments may be spun from a solution containing, by weight, two parts sodium carboxymethyl cellulose and three parts cellulose. A tow of such fibers is well suited for making tampons, and the conditioned fibers have a neutralizing capacity of about 7.8 ml./g. at pH 4.5, as determined by titrations with N/10 sodium hydroxide in biological saline solution.

After formation, the alloy of the polymeric components in the form of filaments, tow or staple may be processed further; e.g., stretched, crimped, plied, or twisted and also treated with finishing agents in the manner known in the art. For example, non-ionic softening and lubricating agents such as those sold under the trade name "Tween 20" by the Atlas Powder Company may be employed in the last wash to facilitate carding and other textile operations. Alternatively, the fibers may be treated with cation active softening and lubricating agents, although their presence in the fiber may reduce somewhat the neutralizing capacity of the tampon. Examples of such agents are those sold under the trade name "Alubraspin" by Jordan & Co. of Philadelphia or under the trade name "Adogen 442" by the Archer Daniels Midland Co.

The amount of alcohol used in the above-described method of forming the fibers may be reduced and a soft and fluffy fibrous product obtained by first reacting the filaments or tow after conversion to the hydrogen form with the cation active agent (e.g., "Alubraspin" or "Adogen 442"), and then rinsing, hydro-extracting and drying. The dried material is then transferred to an apparatus of the Soxhlet type, in which the cation active softening and lubricating agent is extracted with alcohol or other suitable solvents. The solvent is then evaporated from the fibers by distillation and returned to the supply tank of the extractor. This method minimizes cementation between filaments and also the amount of solvent used, and has the further advantage in that it introduces no appreciable changes in the chemical composition of the fibers from which the tampon is made.

A tampon embodying this invention may be of any desired size and configuration. Conventional tampons are usually made of a size and weight to contain sufficient absorbent material to absorb from about 8 to about 10 ml. of menstrual fluid. Typical tampons range in weight from about 1.8 to about 3 grams, are about one-half inch in diameter, and are from about one and one-half to about two inches long. In most instances, despite their potential fluid absorbing capacity, such tampons are usually discarded before they become saturated, e.g., when they have absorbed from about one-half to about two-thirds of the amount of menstrual fluid they are capable of absorbing. Therefore, in preparing tampons in accordance with this invention, it may be desirable to incorporate into the tampon only a sufficient amount of the alloy fiber to neutralize from about 4 to about 10 ml. of menstrual fluid and also to provide the desired acid pH, the remainder of the fibers being of a non-acidifying type.

To this end, the ability of menstrual fluid to neutralize acid must be determined to establish the amount of the polymeric component having acidifying properties necessary to reduce the pH of the menstrual fluid to a value at which the growth of the pathogenic microorganisms is inhibited. Such determination includes a determination of the amount of acid required to reduce the pH of 1 ml. of menstrual fluid from its normal pH of about 7.0 to about 7.5 to the desired pH of from about 4.5 to about 5.0.

Experiments were conducted on specimens of menstrual fluid obtained from different donors to determine the ability of the fluid to neutralize an acid. These fluid specimens were found to vary appreciably but, for practical purposes, it is considered sufficient to utilize the most typical neutralization properties found. In the pH region between 7.5 and 4.5, a typical menstrual fluid was found to have a neutralizing ability about equal to that of N/10 sodium hydroxide. Hence, the ability of an alloy fiber having acidifying properties to reduce the pH of menstrual fluid to about 4.5 may be conveniently expressed in terms of the number of milliliters of N/10 sodium hydroxide that are required to raise the pH of the fibers to about 4.5.

The method of determining the acidity of the alloy fiber with a volumetric standard such as N/10 sodium hydroxide is in principle the same as that ordinarily recommended for the titration of acidic ion exchange resins. An acceptable method is described by Robert Kunin in a book entitled, "Ion Exchange Resins," second edition, page 341 (John Wiley & Sons, Inc.). The titrations disclosed by Kunin are performed in a saline solution of relatively high concentration; e.g., 5% sodium chloride, in order to maximize the liberation of hydrogen ions. However, the method is modified in its application to determine the acidity of the alloy fibers because it does not provide a realistic estimate of the neutralizing ability of the fibers in vivo since the salt content of menstrual fluid is much lower than 5% and is of the order of 0.8%. Therefore, to estimate more properly the neutralizing ability of the fibers in order to determine the amount to be incorporated in the tampon, the titration procedure disclosed by Kunin is conducted in an environment containing about 0.8% NaCl, which is approximately the concentration of biological saline. The values obtained in following the modified method will therefore be somewhat lower than those obtained by the method disclosed by Kunin. For example, in the case of fibers containing an alloy of carboxymethyl cellulose in the hydrogen form and regenerated cellulose, the difference at pH 4.5 will be approximately 20%.

The acidifying capacity of the tampon in vivo can therefore be approximated in terms of the volume of N/10 sodium hydroxide consumed by the fibers in an environment of 0.8% NaCl solution at pH values up to about 4.5. Thus, a tampon of this invention which consumes from about 6 to about 10 ml. of N/10 sodium hydroxide in reaching a pH of 4.5 in a solution containing 0.8% sodium chloride will have adequate acidifying capacity for the amount of menstrual fluid a typical tampon is designed to absorb under normal conditions of use. Such a tampon may have a length of 1¾" and a diameter of ½".

In the case of the alloy fiber described above spun from a viscose solution containing two parts of carboxymethyl cellulose in the hydrogen form to three parts regenerated cellulose, one gram of the conditioned fiber was determined to consume about 7.8 ml. of N/10 sodium hydroxide in reaching a pH of about 4.5. A tampon of such fibers weighing 2.6 grams will thus have an acidifying capacity amounting to about 20 ml. N/10 sodium hydroxide in reaching the same pH. However, as noted above, under normal conditions of use the tampon will probably be discarded after absorbing from about 4 to about 10 ml. of menstrual fluid. It is apparent that, in such instances, the acidifying capacity of such a tampon may be in excess of that ordinarily required. Therefore, the amount of such fibers incorporated in the tampon may be reduced, as for example, by blending the alloy fibers with cotton or rayon in a 1 to 1 ratio. Alternatively, the content of the carboxymethyl cellulose in the hydrogen form in the fiber may be reduced.

The tampons are preferably made from tows or bats of alloy filaments since such tows or bats are readily and economically prepared. If desired, the tampon may also be provided with a textile cover which itself contains alloy fibers to enhance the acidifying effect of the tampon. Since a tampon often has a withdrawal string of twisted or braided fibers, the string may also contain alloy fibers as an additional precaution to reduce the possibility of contamination.

The alloy fibers or filaments may be blended with other naturally occurring fibers or filaments such as cotton or synthetic fibers or filaments such as cellulose acetate and nylon and may also be in the form of bats, card webs, woven or non-woven webs or sheets, paper-like sheets and in other desired forms from which suitable dressings, bandages, dental and vaginal packs, and similar articles used to absorb body fluids may be formed. It is apparent, therefore, that numerous variations and modifications may be made while still remaining within the spirit of the invention.

What I claim is:

1. As a new article of manufacture, a fibrous absorbent dressing for absorbing and acidifying body fluids to lower the pH of such fluids and adjacent body surfaces which it contacts, said dressing comprising a body of multi-component fibers, one of said components being a polymer having textile fiber forming properties, another of said components being an acidfying polymer having cation exchange properties, said polymers being in alloy form in said multi-component fibers.

2. As a new article of manufacture, a fibrous absorbent dressing for absorbing and acidifying body fluids to lower the pH of such fluids and adjacent body surfaces which it contacts, said dressing comprising a body of multi-component fibers, one of said components being a polymer having textile fiber forming properties, another of said components also being a polymer having textile fiber forming properties and having cation exchange properties, said polymers being in alloy form in said multi-component fibers.

3. As a new article of manufacture, a fibrous absorbent dressing for absorbing and acidifying body fluids to lower the pH of such fluids and adjacent body surfaces which it contacts, said dressing comprising a pad of multi-component fibers, one of said components being regenerated cellulose, another of said components being an acidifying polymer, said regenerated cellulose and said acidifying polymer being in alloy form in said multi-component fibers.

4. As a new article of manufacture, a fibrous absorbent dressing for absorbing and acidifying body fluids to lower the pH of such fluids and adjacent body surfaces which it contacts, said dressing comprising a pad of multi-component fibers, one of said components being hydroxyethyl cellulose, another of said components being an acidifying polymer, said hydroxyethyl cellulose and said acidifying polymer being in alloy form in said multi-component fibers.

5. As a new article of manufacture, a fibrous absorbent dressing for absorbing and acidifying body fluids to lower the pH of such fluids and adjacent body surfaces which it contacts, said dressing comprising a pad of multi-component fibers, one of said components being regenerated cellulose, another of said components being carboxymethyl cellulose in the hydrogen form having cation exchange properties, said regenerated cellulose and said carboxymethyl cellulose being in alloy form in said multiple-component fibers.

6. As a new article of manufacture, a fibrous absorbent dressing for absorbing and acidifying body fluids to lower the pH of such fluids and adjacent body surfaces which it contacts, said dressing comprising a pad of multi-component fibers, one of said components being regenerated cellulose, another of said components being polyacrylic acid having cation exchange properties, said regenerated cellulose and said polyacrylic acid being in alloy form in said multi-component fibers.

7. As a new article of manufacture, an absorbent tampon for absorbing and acidifying vaginal fluid to lower the pH of such fluid and adjacent body surfaces which it contacts, said tampon comprising a compressed body of multi-component fibers, one of said components being a polymer having textile fiber forming properties, another of said components being an acidifying polymer in hydrogen form having cation exchange properties, said polymers being in alloy form in said multi-component fibers.

8. A tampon in accordance with claim 7 having a cover.

9. A tampon in accordance with claim 8 having a cover containing said multi-component fibers.

10. As a new article of manufacture, an absorbent tampon for absorbing and acidifying vaginal fluid to lower the pH of such fluid and adjacent body surfaces which is contacts, said tampon comprising a compressed body of multi-component fibers, one of said components being regenerated cellulose, another of said components being carboxymethyl cellulose in the hydrogen form, said carboxymethyl cellulose having cation exchange properties and being present in sufficient amounts in said tampon to neutralize from about four to about twenty cc.'s of N/10 sodium hydroxide, said regenerated cellulose and said carboxymethyl cellulose being in alloy form in said multi-component fibers.

11. As a new article of manufacture, an absorbent tampon for absorbing and acidifying vaginal fluid to lower the pH of such fluid and adjacent body surfaces which it contacts, said tampon comprising a body of absorbent fibrous material compressed into an oblong, cylindrical shape and including multi-component fibers, one of said components being regenerated cellulose, another of said components being carboxymethyl cellulose in the hydrogen form, said carboxymethyl cellulose having cation exchange properties and being present in sufficient amounts in said tampon to neutralize from about four to about twenty cc. of N/10 sodium hydroxide, said regenerated cellulose and said carboxymethyl cellulose being in alloy form in said multi-component fibers.

12. A fibrous absorbent dressing in accordance with claim 5 wherein the amount of carboxymethyl cellulose in said multi-component fibers is at least about 15 percent by weight of said fibers.

13. A fibrous absorbent dressing in accordance with claim 5 wherein the amount of carboxymethyl cellulose in said multi-component fibers is from about 15 percent to about 40 percent of the weight of said fibers.

References Cited by the Examiner

UNITED STATES PATENTS

| | | | |
|---|---|---|---|
| 2,587,717 | 3/52 | Fourness | 128—285 |
| 2,773,000 | 12/56 | Masci et al. | 128—296 |
| 2,783,158 | 2/57 | Entwistle et al. | 106—165 |
| 2,823,163 | 2/58 | Thoms | 167—58 |
| 3,005,456 | 10/61 | Graham | 128—285 |
| 3,055,369 | 9/62 | Graham | 128—285 |
| 3,067,745 | 12/62 | Burgeni et al. | 128—285 |

FOREIGN PATENTS

| | | |
|---|---|---|
| 842,464 | 7/60 | Great Britain. |
| 1,079,796 | 4/60 | Germany. |

RICHARD A. GAUDET, *Primary Examiner.*

RICHARD J. HOFFMAN, *Examiner.*